United States Patent
Ohashi et al.

[11] Patent Number: 6,026,346
[45] Date of Patent: Feb. 15, 2000

[54] NAVIGATION SYSTEM FOR INDICATING OF OPTIMUM ROUTE

[75] Inventors: Mikio Ohashi; Kan Shishido, both of Wako, Japan; Satoshi Tanimoto, Irvine, Calif.

[73] Assignees: Honda Giken Kogyo Kabushiki Kaisha; Alpine Electronics, Inc., both of Tokyo, Japan

[21] Appl. No.: 08/753,634

[22] Filed: Nov. 27, 1996

[51] Int. Cl.[7] .......................... G01C 21/00; G06F 165/00
[52] U.S. Cl. .......................... 701/210; 701/201; 340/990
[58] Field of Search .................................. 701/201, 202, 701/208, 209, 210, 211; 340/988, 990, 995

[56] References Cited

U.S. PATENT DOCUMENTS

| | | | |
|---|---|---|---|
| 4,796,191 | 1/1989 | Honey et al. | 701/217 |
| 4,914,605 | 4/1990 | Loughmiller, Jr. et al. | 345/432 |
| 5,072,395 | 12/1991 | Bliss et al. | 701/200 |
| 5,107,433 | 4/1992 | Helldörfer et al. | 701/202 |
| 5,177,685 | 1/1993 | Davis et al. | 701/200 |
| 5,311,195 | 5/1994 | Mathis et al. | 342/357 |
| 5,337,244 | 8/1994 | Nobe et al. | 701/208 |
| 5,410,486 | 4/1995 | Kishi et al. | 701/211 |
| 5,550,538 | 8/1996 | Fujii et al. | 340/995 |
| 5,659,476 | 8/1997 | Lefebvre et al. | 701/201 |
| 5,689,423 | 11/1997 | Sawada | 701/202 |
| 5,729,217 | 3/1998 | Ito et al. | 340/998 |
| 5,757,289 | 5/1998 | Nimura et al. | 340/995 |
| 5,774,073 | 6/1998 | Maekawa et al. | 340/995 |

*Primary Examiner*—Tan Nguyen
*Attorney, Agent, or Firm*—Nikaido, Marmelstein, Murray & Oram LLP

[57] ABSTRACT

A navigation method and apparatus and a navigation program are provided for guiding a vehicle to a destination along a guide route. An off-route detection unit detects an off-route condition when the vehicle is displaced from the guide route and a guide route searching unit searches or determines, when the off-route detection unit detects an off-route condition, a route from a present position of the vehicle to the destination or return point on the guide route. The guide route determining or searching unit includes a weight factor determining unit for determining a weighting value to modify or scale a road parameter used in determining the guide route, a modifying unit for modifying the parameter based on the weighting value, and a calculating unit for calculating a route from the present position of the vehicle to the destination or the return point on the guide route, as a function of the modified parameter. A display is provided for displaying the guide route to the operator of the vehicle.

19 Claims, 13 Drawing Sheets

(1) STARTING POINT
— (3) GUIDE ROUTE
• (4) NODE
(2) DESTINATION
IRT

FIG.6

| (1) ADDRESS | |
|---|---|
| F000 | (2) STARTING POINT DATA |
| F001 | (3) NODE $N_1$ |
| F002 | (4) NODE $N_2$ |
| ⋮ | (5) GUIDE ROUTE MEMORY |
| FFFF | (6) DESTINATION DATA (NODE NO.) |

NAVIGATION SYSTEM FOR INDICATING OF OPTIMUM ROUTE

BACKGROUND OF THE INVENTION

This invention relates to a navigation system, a method of navigation, and a navigation computer program especially for an automobile. The navigation system for an automobile which has a display for displaying a moving map in accordance with a estimated present position and road database is known in U.S. Pat. No. 4,535,335 and U.S. Pat. No. 4,468,581. Further map matching technology in which the estimated present position is corrected based upon a road database to correct errors in the estimated present position data which can include an integral error caused by sensor error is also known in U.S. Pat. No. 4,660,161. U.S. Pat. No. 5,323,321 discloses navigation system which includes maneuver guidance which uses a maneuver graphic arrow while the vehicle moves along guidance route. The guidance route is determined based on starting position, e.g. present position before driving, and destination which is inputted by the driver before the guidance route is calculated.

However, if the driver misses making a turn in accordance with the maneuver direction at a corner, or if the driver intentionally passes a corner in order to make a turn at another corner, the navigation system indicates that the vehicle is off-route. After off-route detection, a recalculating method for a new optimum route for a destination is known in U.S. Pat. No. 5,291,414. Based on the prior art for determining the new route when the driver misses the turn at the maneuvered corner, the CPU calculates from the starting position to calculate toward the destination. In the prior art, the vehicle continues to move while the CPU is calculating a new route, and the driver could miss the turn at a new maneuvered corner if the navigation system instructs the new maneuvered corner after passing or just before the corner. The prior art system thus determines a starting position in place of the present position for recalculation to take the new optimum route by shifting forward a certain distance from the present position. U.S. Pat. No. 5,291,414 discloses that distance between present position and the starting point for making recalculation should change in accordance with vehicle speed. However, this technology could still cause an off-route condition if the destination is a far place. In this case since a long period of time is necessary to finish recalculation and the vehicle is driven while the recalculation is executed, a driver could miss a turn if the vehicle position is at or beyond the intersection at which it should make the turn based on the result of recalculation.

In order to overcome the problem in prior art, assignee's copending application, Ser. No. 08/733,745, filed Oct. 16, 1996, based upon Japanese Patent Application No. Hei 7-342646, which is incorporated herein by reference, is directed to shortening the period for recalculation. This application discloses a return point which is used for executing the recalculation to determine a new route from present vehicle position to the return point when the vehicle falls into an off-route condition. Based upon the disclosure of this application, the distance between present position and the return point, which is determined, is limited to short distance. Therefore, the chance of a second off-route condition can be reduced since period of recalculation is short.

However, if the vehicle is waiting for a traffic signal located at an intersection at which it is to take a turn towards the return point, it could be difficult to turn according to the result or recalculation which has been executed while the vehicle has stopped.

SUMMARY OF THE INVENTION

It is an object of the present invention to determine a new route which has less possibility of a second off-route condition in case of an off-route situation.

Another object of the present invention is to determine a new route which has tendency to go straight in response to vehicle speed, in order to avoid unnecessary turns when the vehicle is near an intersection which would require it to be maneuvered.

The present invention is directed to a navigation method, apparatus and a computer program for guiding a vehicle to a destination along a guide route. An off-route detection unit detects an off-route condition when the vehicle is displaced from the guide route and a guide route searching unit searches or determines, when the off-route detection unit detects an off-route condition, a route from a present position of the vehicle to the destination or return point on the guide route. The guide route determining or searching unit includes a weight factor determining unit for determining a weighting value to modify or scale a road parameter used in determining the guide route, a modifying unit for modifying the parameter based on the weighting value, and a calculating unit for calculating a route from the present position of the vehicle to the destination or the return point to the guide route as a function of the modified parameter. A display is provided for displaying the guide route to the operator of the vehicle.

DESCRIPTION OF THE PREFERRED EMBODIMENT

Figure 1:
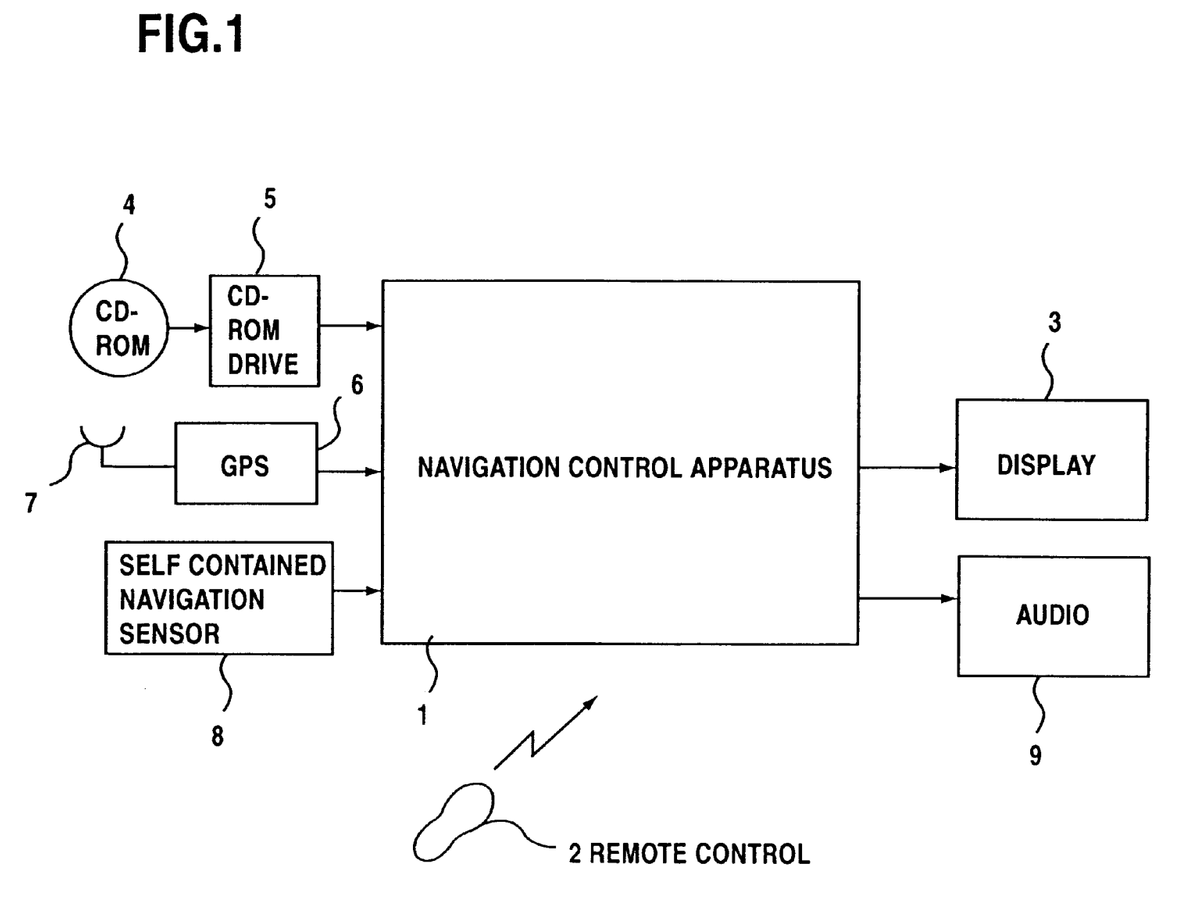
FIG. 1 is a block diagram of a navigation apparatus to which the present invention is applied.

FIG. 1 shows a general construction of a navigation system to which the present invention is applied. Referring to FIG. 1, the navigation system shown includes an navigation control apparatus 1, a manually operable device 2 such as a remote controller which is manually operated to input various instructions to the navigation control apparatus 1 and set a guide route and various data. A display apparatus 3 displays a map, a guide route, an intersection location map, a menu, etc. and a CD-ROM 4 in a CD-ROM drive 5, serves as a map data base in which map information is stored. The computer program for controlling the navigation system may be embodied within the control apparatus 1 or on the CD-ROM 4. A GPS receiver 6 receives radio waves from several artificial satellites, to measure a current position and orientation of a vehicle, and a multi-beam antenna 7 receives the radio waves from the artificial satellites. The system also includes a self-contained navigation sensor 8, and an audio apparatus 9 which may be a car audio system for outputting a guidance voice for an intersection.

The multi-beam antenna 7 performs three-dimensional and two-dimensional position measurement processing to calculate the position and the orientation of the vehicle, the orientation being defined as a direction of a line interconnecting a vehicle position obtained by a current detection cycle and another vehicle position obtained during the preceding sampling time $\Delta T$, and outputs the calculated position and orientation together with the time of the measurement. Though not shown in FIG. 1, the self-contained navigation sensor 8 includes a relative orientation sensor (angular sensor) such as an oscillation gyro for detecting an angle of turning movement of the vehicle, and a distance sensor which generates a pulse each time the vehicle travels a predetermined distance.

Figure 2:
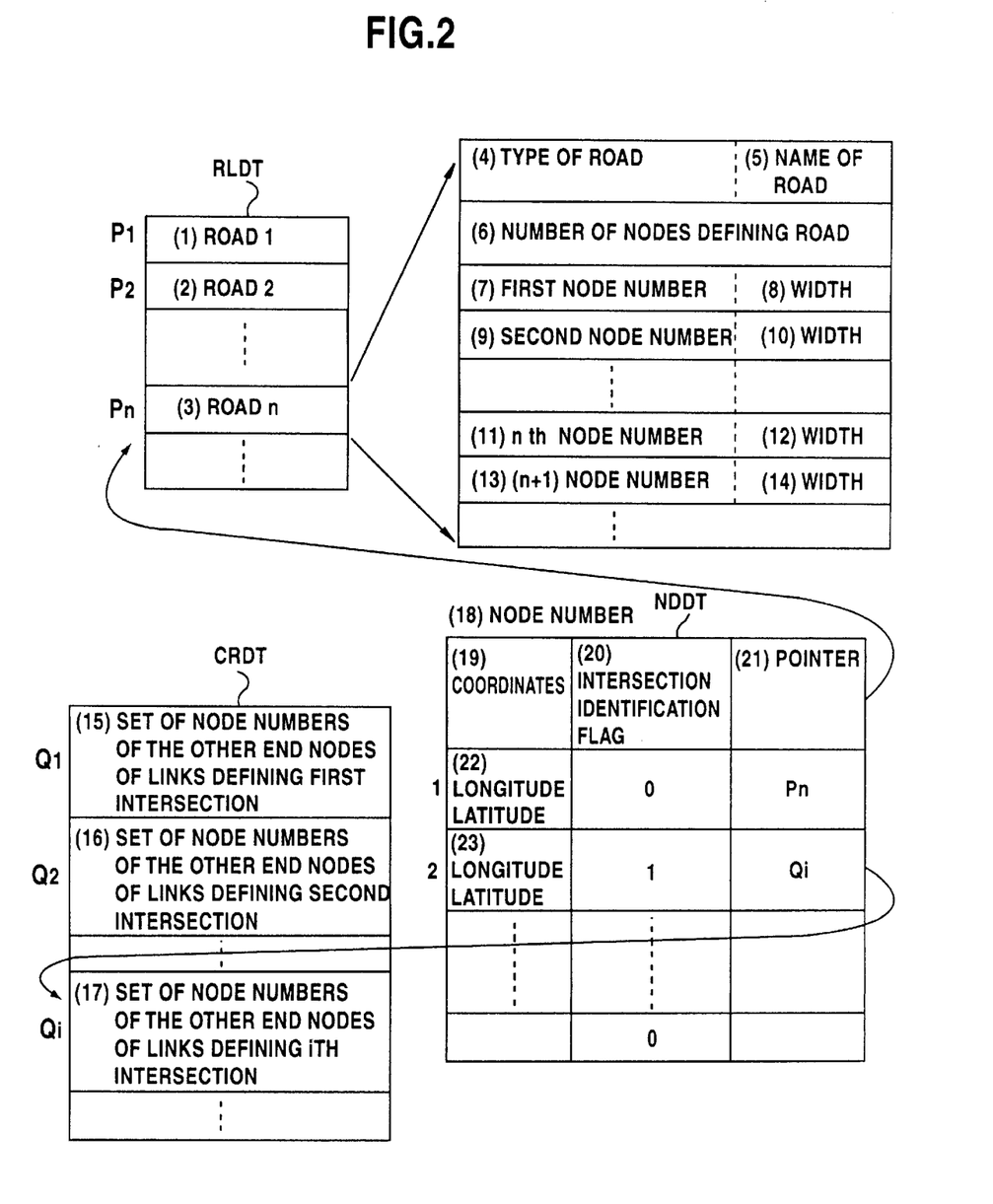
FIG. 2 is a diagrammatic view illustrating a construction of road data in map data used in the navigation apparatus of FIG. 1.

The map information stored on the CD-ROM 4 is composed of 1) a road layer, 2) a background layer for displaying an object on a map, 3) a character layer for displaying characters of the name of a city, a town or a village, and 4) an IIS layer in which IIS (Integrated Information Service) information is stored. Of these layers, the road layer includes road link data RLDT, node data NDDT and intersection data CRDT as shown in FIG. 2.

The road link data RLDT provides attribute information of the roads and includes data of the total node numbers on the road links, numbers of the nodes forming the roads, road numbers and names, types of roads, e.g., national road, expressway, local district road, etc.

The intersection data CRDT is provided for the individual intersections on the map and represents sets of nodes, called intersection composing nodes, which are nearest to the intersections from among nodes on those links connected to the intersections. The node data NDDT is a list of all nodes defining the roads and includes, for each node, position information, i.e., the latitude and the longitude, an intersection identification flag representing whether or not the node is an intersection, a pointer which represents intersection data when the node is an intersection but, when the node is not an intersection, represents a road link to which the node belongs, etc.

Figure 3:
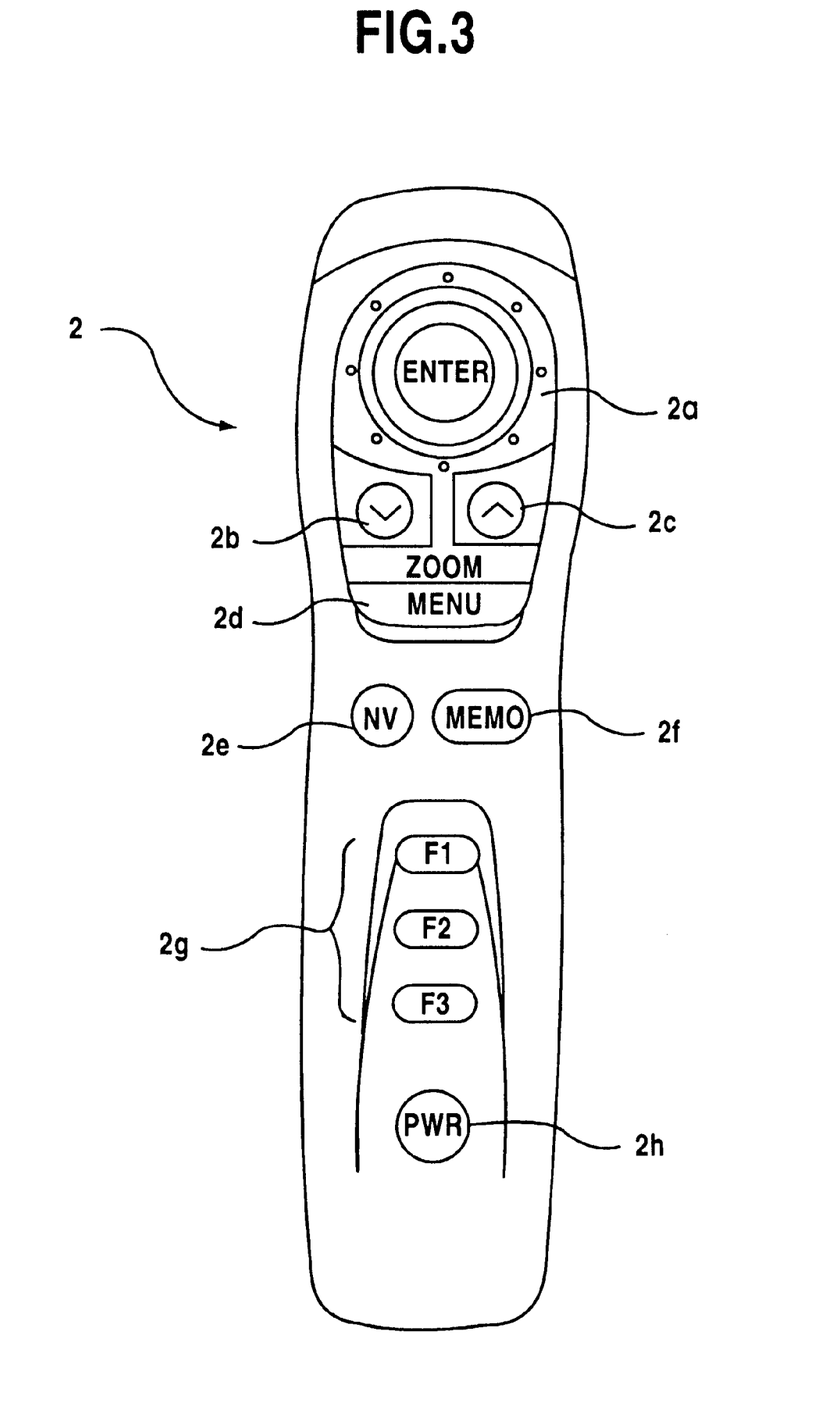
FIG. 3 is a schematic view of a remote controller shown in FIG. 1.

FIG. 3 shows a remote controller. Referring to FIG. 3, the remote controller 2 includes a joy-stick key 2a which is manually operated to move a cursor (called focus), a self-vehicle mark or some other mark in any of eight directions relative to a displayed map, and to move a menu selection bar in the leftward, rightward, upward and downward direction on a display screen in order to select a desired menu item or to select a menu. The remote controller 2 further includes an enlargement key 2b which is manually operated to display a map of a detail level, a reduction key 2c which is manually operated to display a wide area map, and a menu key 2d which is manually operated to display a menu. The remote controller 2 further includes a navigation key (NV key) 2e which is manually operated to display a map of a region in which the vehicle position is present together with the self-vehicle mark, a memory key (MEMO key) 2f which is manually operated to store a desired location into a memory, a function key 2g to which a function which is used frequently is set, to allow selection of the function, and a power supply key 2h.

The navigation apparatus can be placed into an automatic route search on mode by manually operating the joy-stick key 2a to display an automatic route search mode on/off indication on the display screen and select the "on" alternative, or can be placed into an automatic route search office mode by manually operating the joy-stick key 2a to select the "off" alternative. Further, when the vehicle enters an off-route condition while the navigation apparatus is in the automatic route search on mode, then the navigation apparatus automatically searches for a route. On the other hand, when the navigation apparatus is in the automatic route search off mode, the navigation apparatus can be instructed to start route searching by depressing the navigation key 2e, while the vehicle is traveling.

Figure 4:
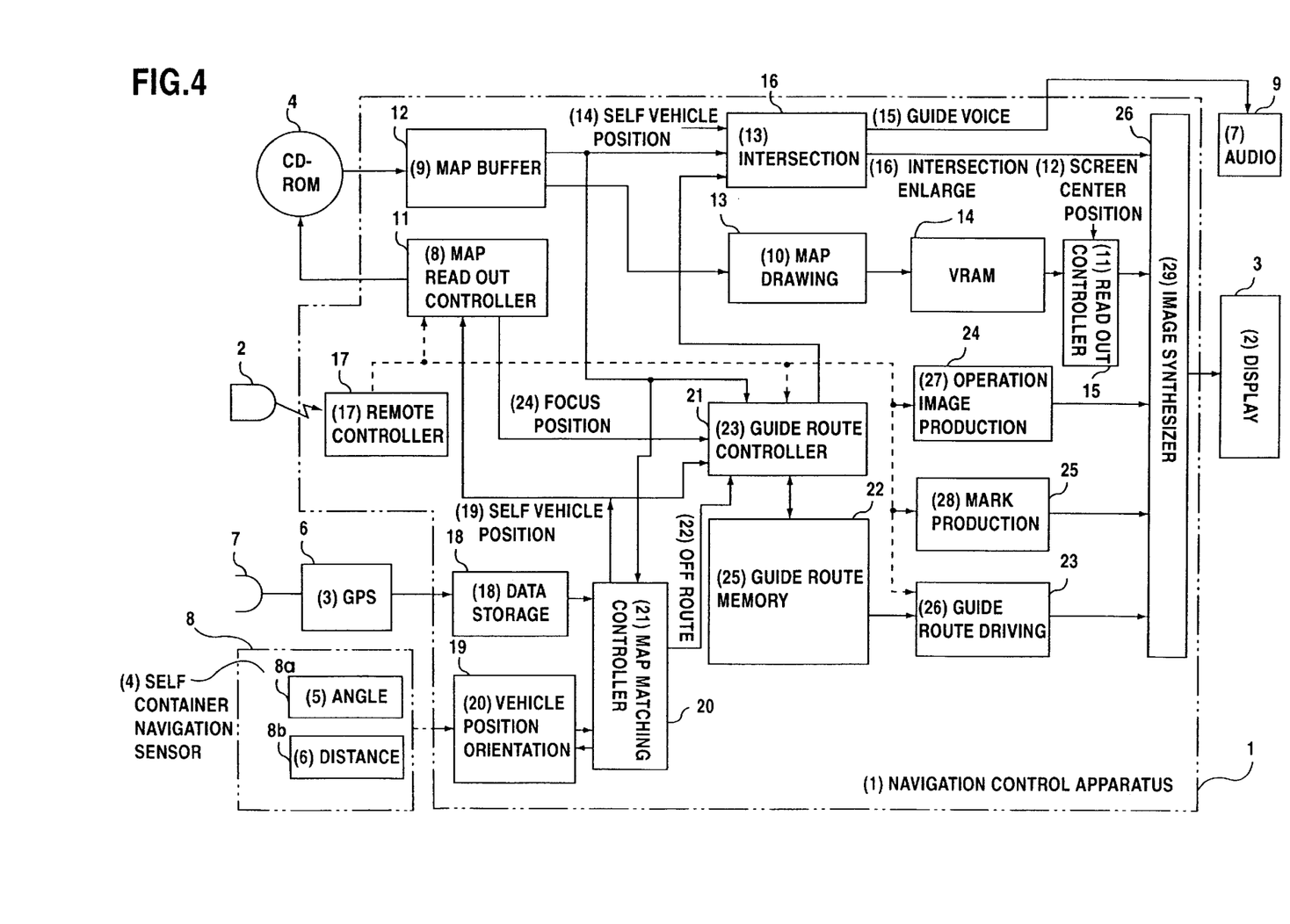
FIG. 4 is a block diagram showing a detailed construction of a navigation control apparatus shown in FIG. 1.

FIG. 4 shows a detailed construction of the navigation control apparatus. Referring to FIG. 4, the navigation control apparatus 1 is shown together with the remote controller 2, the display apparatus 3, the CD-ROM 4 on which map information is stored. The GPS receiver 6, the multi-beam antenna 7, the self-contained navigation sensor 8, and the audio apparatus 9. The self-contained navigation sensor 8 includes a self-contained navigation sensor (angle sensor) 8a such as an oscillation gyro or the like for detecting an angle of turning movement of the vehicle, and a distance sensor 8b which generates a pulse each time the vehicle travels a predetermined distance.

The navigation control apparatus 1 includes a map read-out controller 11 which (1) calculates a focus position (the position of the center of the screen represented in longitude and latitude) when a map moving operation or a map selecting operation is being performed using the joy-stick key, the map reduction or enlargement key or the like and (2) reads out predetermined map information from the CD-ROM 4 based on the self-vehicle position, the focus position or the like. The navigation control apparatus 1 further includes a map buffer 12 for storing map information read out from the CD-ROM 4. In order to allow scrolling of a map, which will be hereinafter described, information from a plurality of maps (units) around the self-vehicle position or the focus position such as, for example, information from a display of 3×3 units is read out from the CD-ROM 4 and stored into the map buffer 12. The navigation control apparatus further includes a map drawing section 13 for generating a map image using map information stored in the map buffer 12, a random access memory 14 for storing the map image, and a read-out controller 15 for varying the position of map information for one image to be read out from the VRAM 14 based on the position of the center of the screen (self-vehicle position, focus position) and to scroll a map being displayed in accordance with the movement of the self-vehicle position or the focus position.

The navigation control apparatus 1 further includes an intersection guidance section 16 which gives guidance relating to an approaching intersection by means of a display image or voice. In particular, during actual route guidance, when the vehicle reaches a predetermined distance from the approaching intersection, the intersection guidance section 16 causes a location map of the intersection which is an enlarged view of the intersection and an arrow mark of a direction in which the vehicle is to advance toward the destination, to be displayed on the screen and also gives guidance of the direction in which the vehicle is to be advanced by voice. The navigation control apparatus 1 further includes a remote-controller control section 17 for receiving a signal generated in response to the manual operation of the remote controller 2 and delivering a required instruction to a relevant component, a GPS data storage section 18 for storing GPS data from the GPS receiver 6, a vehicle position-orientation calculation section 19 for calculating a self-vehicle position which is an estimated vehicle position and a vehicle orientation based on the output of the self-contained navigation sensor 8. Still further, the control apparatus 1 includes a map matching controller 20 for performing map matching processing using a projection method based on map information stored in the map buffer 12 as well as the estimated vehicle position and the vehicle orientation each time the vehicle travels a predetermined distance, for example, 10 m, to correct the position of the vehicle so that it remains on the route on which the vehicle is traveling. When the vehicle position is corrected to a position on some road, if the road does not form the guide route, then the map matching controller 20 determines that the vehicle has gone off of the guide route and outputs an off-route signal.

Figure 5:
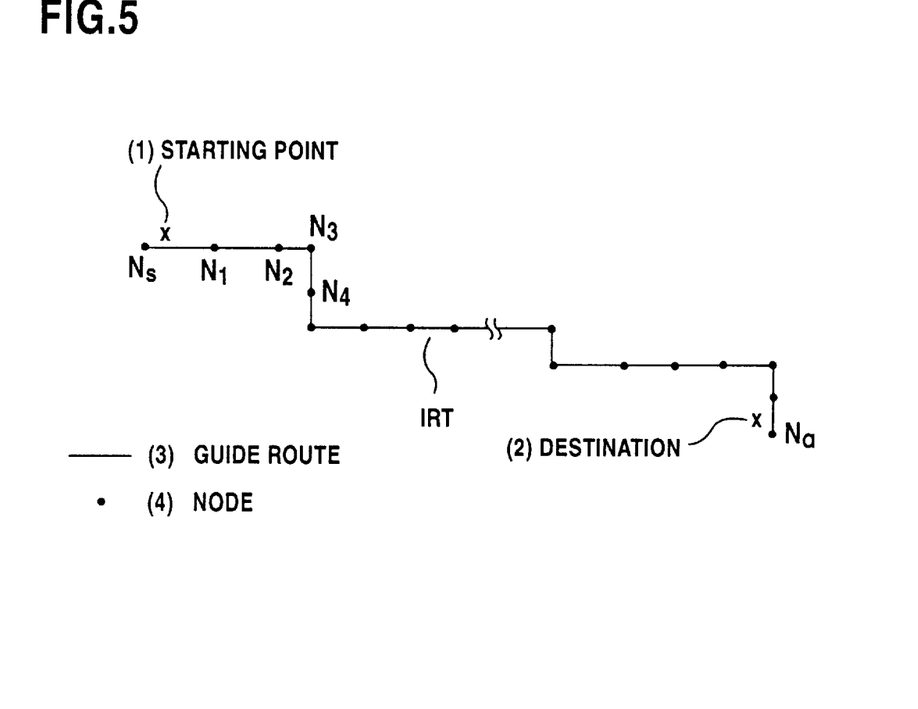
FIG. 5 is a diagrammatic view showing a node train forming a guide route.
Figure 6:
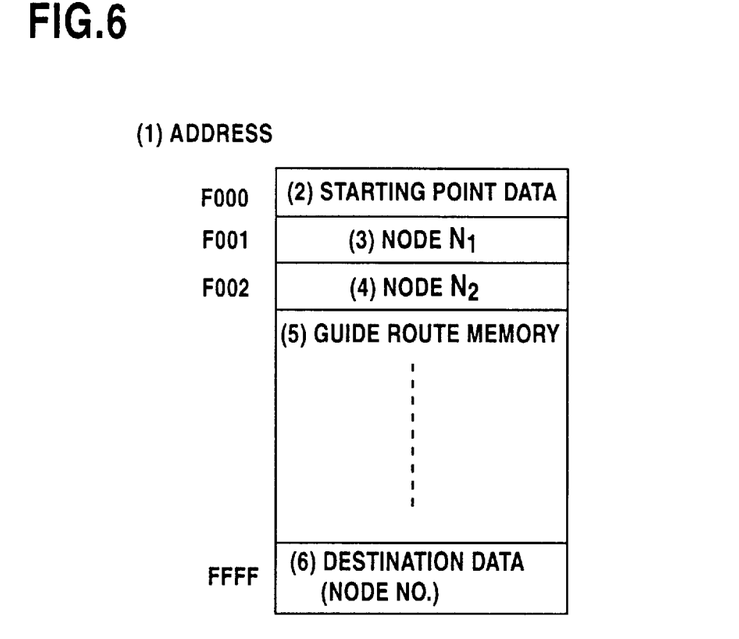
FIG. 6 is a diagrammatic view illustrating guide route data stored in a guide route memory shown in FIG. 4.

The navigation control apparatus 1 further includes a guide route controller 21 for performing the calculation of a guide route from a starting point to a destination both inputted to the navigation apparatus and for performing, when the vehicle goes off of the guide route and enters an off-route condition, a searching process for a route which will be hereinafter described, a guide route memory 22 for storing the guide route, and a guide route drawing section 23. In the guide route memory 22, all nodes $N_s$, $N_i$(i=1, 2, ...) and $N_o$ on the guide route IRT (refer to FIG. 5) calculated by the guide route controller 21 from the starting point to the destination, are stored in such a manner as illustrated in FIG. 6. The guide route drawing section 23 reads out, during traveling of the vehicle, guide route information in the form of a node train, from the guide route memory 22 and draws the guide route on a map.

The navigation control apparatus 1 further includes an operation image production section 24 for producing various menu images (operation images) to be displayed; a mark production section 25 for producing and outputting various marks such as the self-vehicle mark, the cursor or focus, etc., and an image synthesizer 26.

Figure 7:
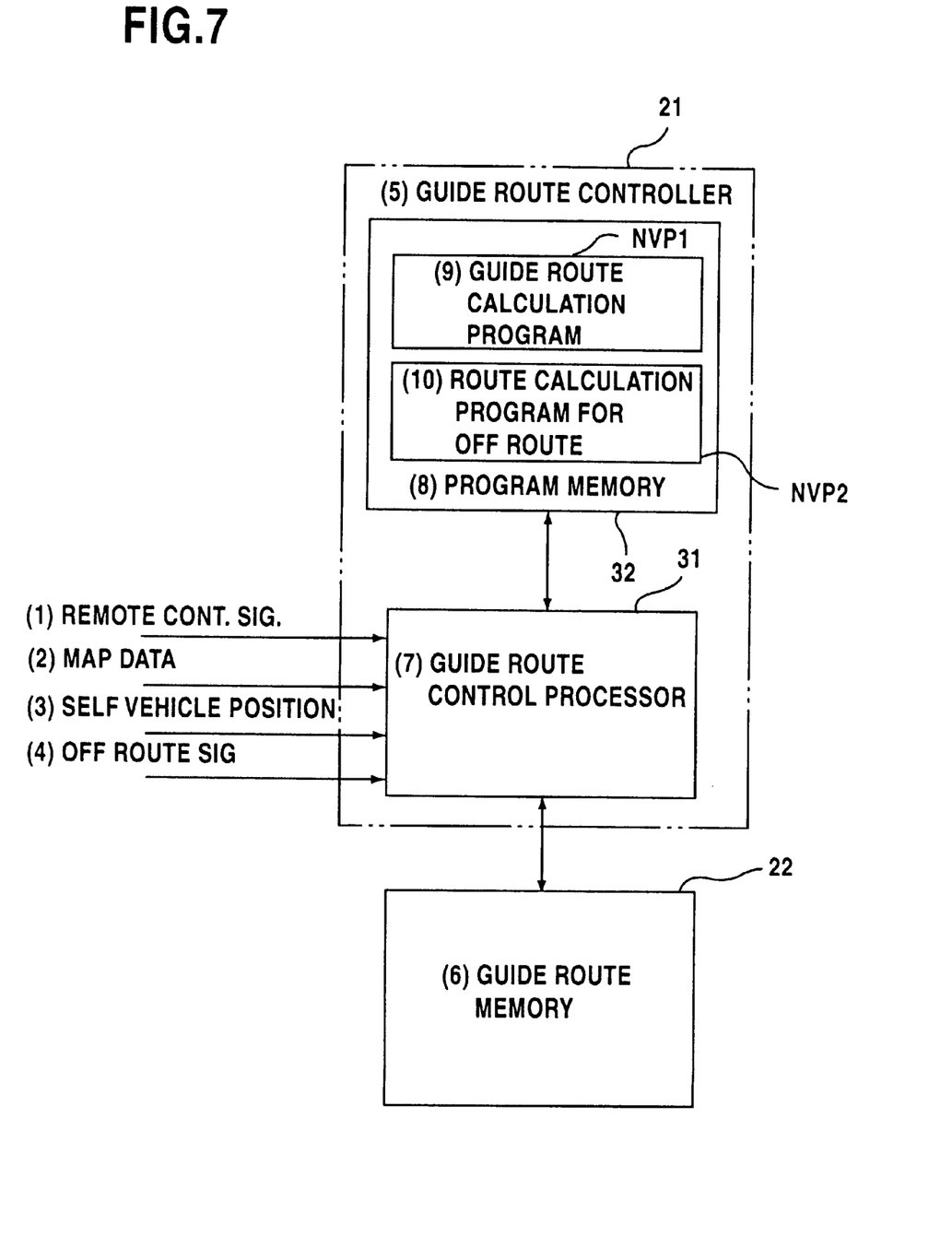
FIG. 7 is a block diagram showing a guide route controller shown in FIG. 4.

FIG. 7 shows a detailed construction of the guide route controller 21. The guide route controller 21 is shown together with the guide route memory 22 and includes a guide route control processor 31, and a program memory 32 for storing a guide route calculation program NVP1 or a route calculation program NVP2, which is used when the vehicle is in an off-route condition.

Figure 8:
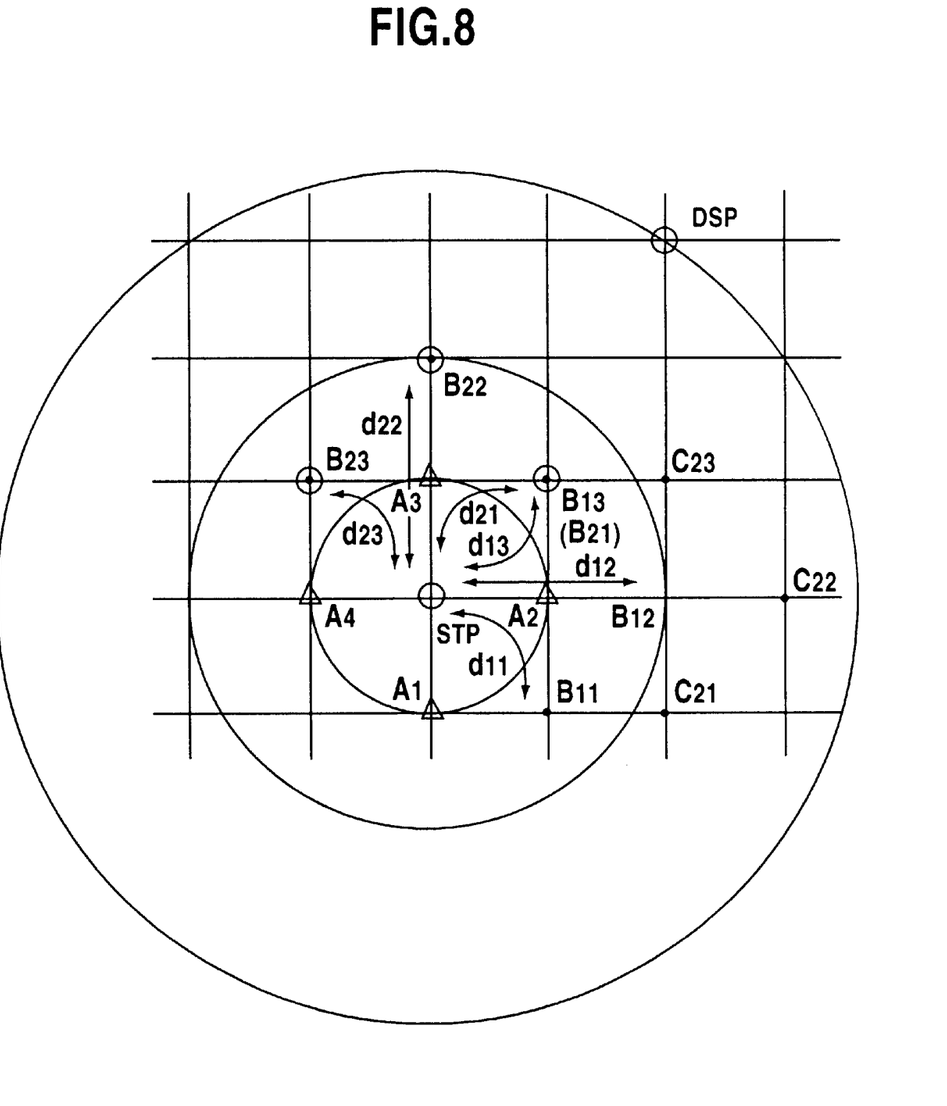
FIG. 8 is a diagrammatic view illustrating the Dijkstra method.

The guide route calculation program NVP1 is used to calculate a guide route from a starting point to a destination, and the Dijkstra method, which is known, is applied to the case wherein a shortest distance route is employed as a guide route. The Dijkstra method searches for the shortest route from a starting point to a destination taking all intersections included in a region defined by a circle whose radius is a straight line interconnecting the starting point and the destination or in a region a little greater than the region defined by the circle. FIG. 8 illustrates an outline of the Dijkstra method. Referring to FIG. 8, a map is shown as a graph wherein roads are represented by straight lines and intersections are represented as crossing points of the straight lines. The distances between adjacent intersections shown are known, and the starting point and the destination are denoted by STP and DSP, respectively.

According to the Dijkstra method, first-order intersections A1 to A4 adjacent the starting point STP are detected, and the 0th-order intersection (starting point) and the distances from the starting point to the first-order intersections A1 to A4 are stored in a memory in a corresponding relationship to the first-order intersections A1 to A4. Then, second-order intersections Bij from the first-order intersections A1 to A4 are detected, and the first-order intersections and the distances from the starting point to the second-order intersections Bij are calculated in a corresponding relationship to the second-order intersections Bij. For example, from the first-order intersection A2, three second-order intersections B11, B12, and B13 are detected, and in a corresponding relationship to the second-order intersections B11, B12 and B13.

B11: the first-order intersection A2 and the distance d11 from the starting point, B12: the first-order intersection A2 and the distance d12 from the starting point, and B13: the first-order intersection A2 and the distance d13 from the starting point         (a)

are stored into the memory. From the first-order intersection A3, three second-order intersection B21, B22 and B23 are detected, and in a corresponding relationship to the second-order intersections B21, B22 and B23, B21: the first-order intersection A3 and the distance d21 from the starting point,         (b)

B22: the first-order intersection A3 and the distance d22 from the starting point, and B23: the first-order intersection A3 and the distance d23 from the starting point are stored into the memory. Also from the other first-order intersections A1 and A4, second-order intersections are calculated and stored as data into the memory in a similar manner.

The intersections B13 and B21 are identical with each other. When intersections whose data are to be stored overlap with each other in this manner, the distances d13 and d21 from the starting point are compared with each other in magnitude, and only that data which exhibits a lower value is stored. For example, if d13>d21, then the data of (b) is finally stored as data of the intersection B13 (=B21) whereas the data of (a) is deleted.

Thereafter, third-order intersections Cij from the second-order intersections are detected and then the second-order intersections and the distances from the starting point are calculated and stored in a corresponding relationship to the third-order intersections in a similar manner, Thus, generally if (i+1)-order intersections are detected from i-order intersections and the i-order intersections and the distances from the starting point are stored into the memory in a corresponding relationship to the (i+1)-order intersections, the destination DSP is finally reached.

After the destination DSP is reached, a route obtained by successively interconnecting the (m−1)-order intersection stored corresponding to the destination (given as an m-order intersection), and the (m−2)-order intersection stored corresponding to the (m−−1)-order intersection, . . . , the first-order intersection stored corresponding to the second-order intersection and the 0-order intersection (starting point) stored corresponding to the first-order intersection makes the shortest route. It is to be noted that an optimum guide route is determined actually taking such a condition into consideration that priority is given to an expressway or to a road having a greater width.

Figure 9:
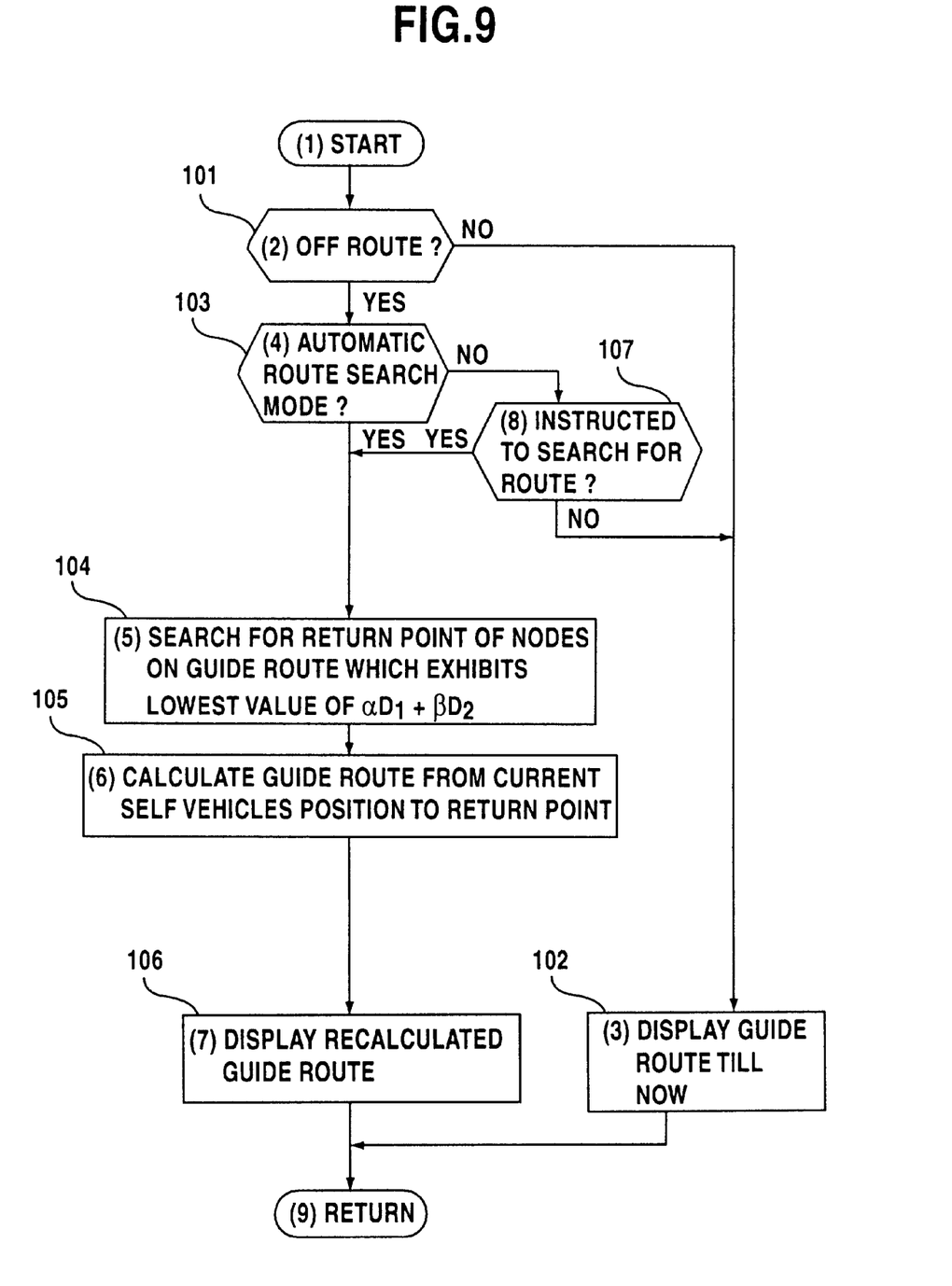
FIG. 9 is a flow chart illustrating the guide route re-calculation processing of the guide route controller of FIG. 7, when a vehicle is in an off-route condition.

The route calculation program NVP2 for an off-route condition is used to re-calculate a guide route when the vehicle enters an off-route condition, and is illustrated in a flow chart of FIG. 9.

Referring to FIG. 9, the guide route control processor 31 in the guide route controller 21 supervises a signal from the map matching controller 20 (FIG. 4) to determine whether or not an off-route condition is entered at Step 101. When an off-route condition is not determined, the navigation apparatus guides the vehicle in accordance with a guide route which is currently being used at Step 102.

Figure 10:
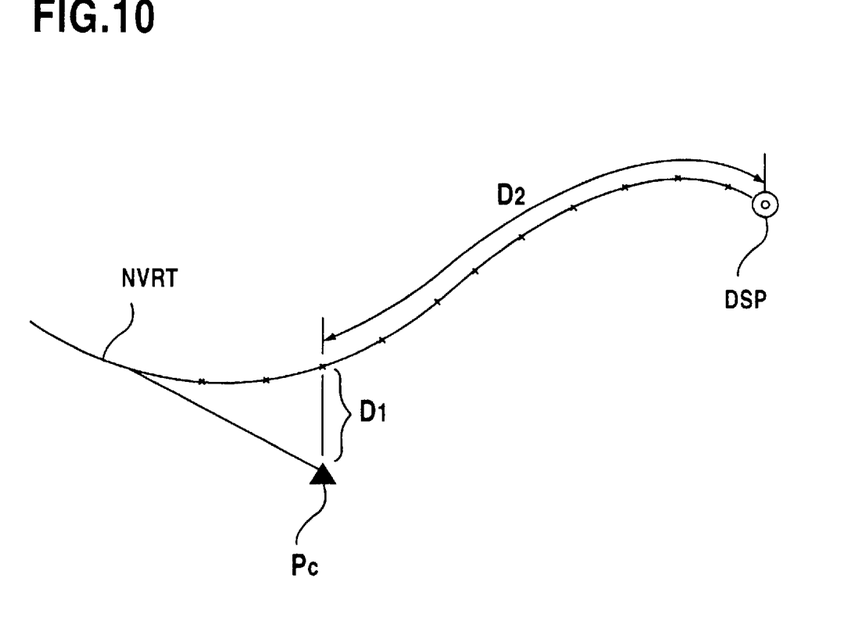
FIG. 10 is a diagrammatic view illustrating the determination of a return point by the guide route controller of FIG. 7.

However, if an off-route signal is received from the map matching controller 20, then the guide route controller processor 31 starts processing in accordance with the route calculation program NVP2 for an off-route condition. In particular, the guide route control processor 31 first checks whether or not the navigation apparatus is in the automatic route search on mode at Step 103. If the navigation apparatus is in the automatic route search on mode, then the guide route control processor 31 calculates rectilinear distances D1 from the vehicle position Pc to all of the nodes (each being indicated by an "X") on the guide route NVRT which have not been passed by the vehicle as yet and route distances D2 from the nodes to the destination DSP along the guide route NVRT as shown in FIG. 10. Then, sums D of modified or corrected distances $\alpha \cdot D1$ and $\beta \cdot D2$ are calculated using the following equation (5):

$$D = \alpha \cdot D1 + \beta \cdot D2 \tag{5}$$

where $\alpha < \beta$, and for example, $\alpha = 0.3$ and $\beta = 0.7$. In other words, for each node, a sum D of modified distances $\alpha \cdot D$ and $\beta \cdot D$ when the distances D1 and D2 are modified setting the weighting coefficient $\beta$ for the route distance D2 to a value higher then the weighting coefficient $\alpha$ of the rectilinear distance D1 is calculated. Thereafter, a node whose sum D of modified distances exhibits the lowest value is determined as a return point at Step 104.

After the return point is determined, the guide route control processor 31 searches for a route from the vehicle position in an advancing direction of the vehicle, toward the return point from one direction using the Dijkstra method or the like at Step 105. Then, the guide route control processor 31 causes the thus searched out route to be displayed, guides the vehicle toward the return point, and guides, the vehicle to the destination along the initial guide route at Step 106, after the vehicle reaches the return point.

On the other hand, when the navigation apparatus is in the automatic route search off mode in Step 103, the guide route control processor 31 supervises a signal from the map matching controller 20 to detect whether or not an instruction to search for a route is received from the remote controller 2 at Step 107, and if an instruction to search for a route is not received from the remote controller 2, then the guide route which is currently being used is displayed at Step 102. However, if an instruction to search for a route is received after an off-route condition is entered, then route searching is performed by the process beginning with Step 104.

Figure 11:
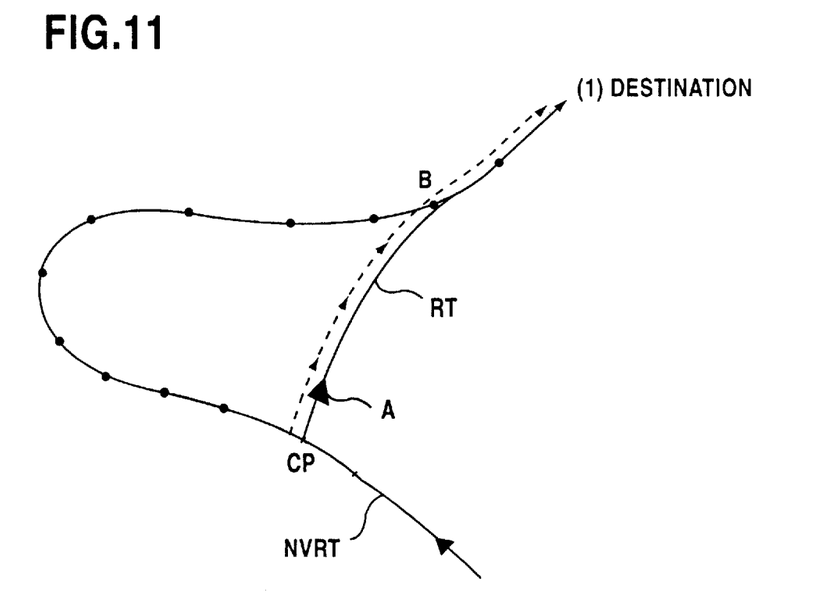
FIG. 11 is a diagrammatic view illustrating route searching by the navigation apparatus of FIG. 1.

As described above, by determining a node whose sum of modified distances is calculated using the equation (5) given hereinabove as a return point, the return point is determined by attaching greater importance to the route distance D2 rather than the rectilinear distance D1. As a result, a route which gives a comparatively short total traveling distance from the vehicle position to the destination can be searched out. For example, if the vehicle travels along the guide route NVRT indicted by a solid line in FIG. 11 and enters an off-route condition at a point CP, then if the navigation apparatus is in the automatic route search on mode, then route searching is started immediately, but if the navigation apparatus is in the automatic route search off mode, route searching is started when an instruction to search for a route is received. In such route searching, the navigation apparatus determines the node B as a return point by the processing described above and searches for a route RT from the point A to the point B. As a result, the navigation apparatus can guide the vehicle along the route RT which is a comparatively short travel distance to the destination.

It is to be noted that, while, in the foregoing description, the calculation of the equation (5) is performed for all of those nodes which have not been passed by the vehicle as yet, the route calculation program NVP2 for an off-route condition may be configured such that the calculation of the equation (5) is performed successively for the nodes in the passing order in the guide route and a node at which the value of D exhibits a change from decrease to increase with respect to the value of D at the immediately preceding node is determined as a return point and the calculation for the following nodes is omitted.

Figure 12:
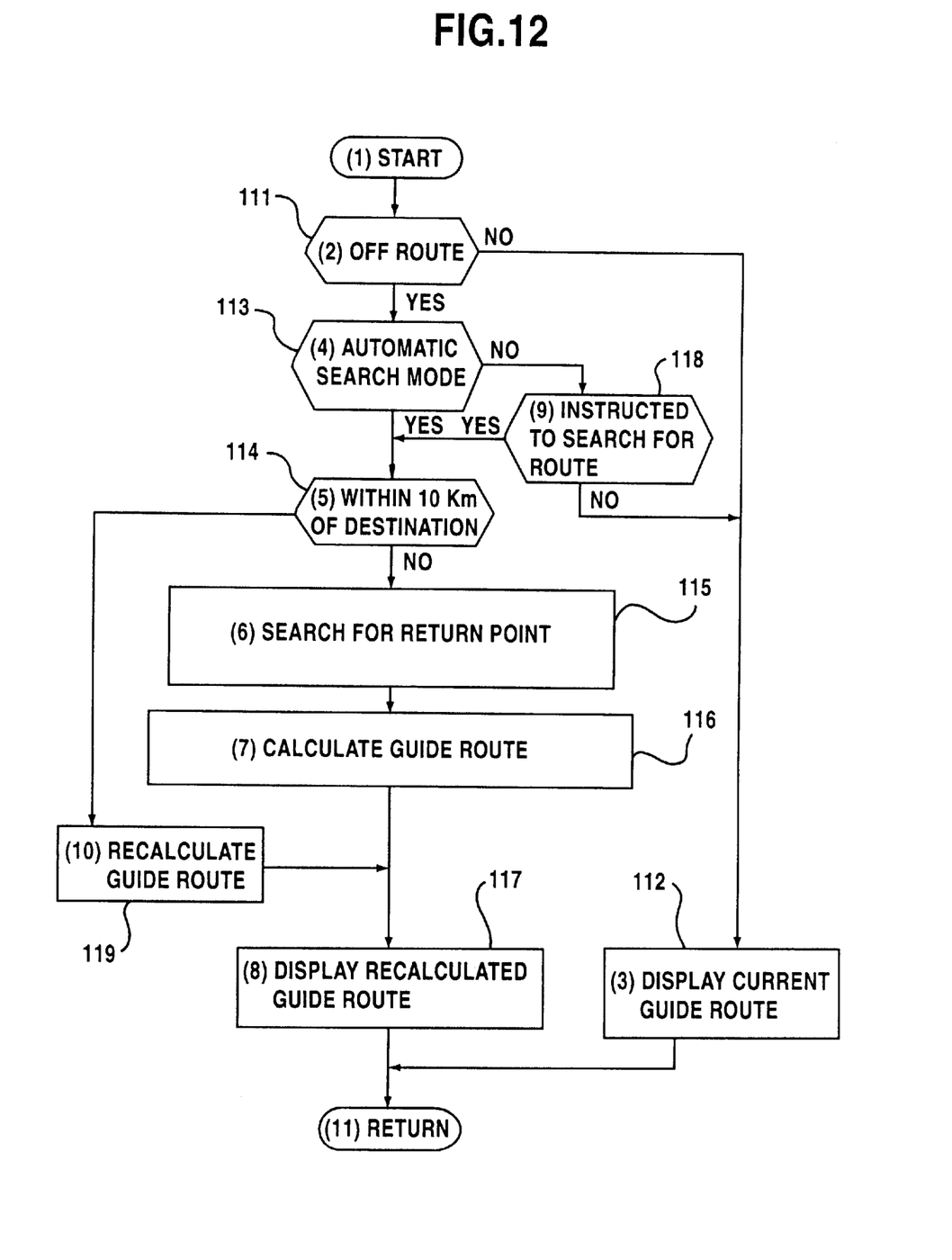
FIG. 12 is a flow chart illustrating an alternative guide route recalculation process of the guide route controller of FIG. 7, when a vehicle is in an off-route condition.

FIG. 12 is a flow chart illustrating an alternative route calculation process for an off-route condition. In the route calculation process described in paragraph (c) above, the rectilinear distance from the vehicle position to the destination at the point of time of route searching is not taken into consideration. In contrast, in this alternative route calculation process, calculation of a guide route is performed taking the rectilinear distance from the vehicle position to the destination into consideration.

The guide route control processor 31 (FIG. 7) sends a signal from the map matching controller 20 (FIG. 4) to detect whether or not the vehicle is in an off-route condition (Step 111). If the vehicle is not in an off-route condition, then the navigation apparatus guides the vehicle in accordance with the current guide route at Step 112.

However, if an off-route signal is inputted from the map matching controller 20 to the guide route control processor 31, then the guide route control processor 31 starts processing in accordance with the route calculation program NVP2 for an off-route condition. First, the guide route control processor 31 checks whether or not the navigation apparatus is in the automatic route search on mode (Step 113). If the navigation apparatus is in the automatic route search on mode, then the guide route control processor 31 calculates a rectilinear distance D3 from the vehicle position to the destination and discriminates whether or not the rectilinear distance D3 is equal to or smaller than a preset value, for example, 10 Km (Step 114). If the rectilinear distance D3 is greater than the preset value, or in other words, if the vehicle is spaced by a comparatively large distance from the destination, the guide route control processor 31 calculates a return point and searches for a route to the return point in a manner similar to the route calculation process described above. In particular, the guide route control processor 31 calculates rectilinear distances D1 from the vehicle position Pc to all of those nodes on the guide route NVRT (FIG. 10) which have not as yet been passed by the vehicle and route distances D2 from the nodes to the destination DSP along the guide route NVRT. Then, the guide route control processor 31 calculates sums D of modified distances α·D1 and β·D2 using the equation (5) and determines a node whose sum D of modified distances exhibits the lowest value as a return point (Step 115).

After the return point is determined, a route from the vehicle position in an advancing direction of the vehicle toward the return point is searched for from one direction by the Dijkstra method or some other suitable method using a recalculation subroutine (Step 116). While details will be hereinafter described, the recalculation subroutine modifies or scales the distance between intersections located in the advancing direction of the vehicle on the same road as the road on which the vehicle is traveling so that the result of the searching may be a rectilinear route, as far as possible. After the result of the searching is obtained by the subroutine, the route thus searched out is displayed so that the vehicle is guided to the return point, and after the vehicle returns to the return point, the navigation apparatus guides the vehicle to the destination along the initial guide route (Step 117).

On the other hand, when the navigation apparatus is in the automatic route search off mode in Step 113, the guide route control processor 31 generates a signal from the map matching controller 20 to detect whether or not an instruction to search for a route is received from the remote controller 2 (Step 118), and if an instruction to search for a route is not received from the remote controller 2, then the current guide route is displayed (Step 112). However, if an instruction to search for a route is received after an off-route condition is entered, route searching is performed by the processing beginning with Step 114.

However, when the rectilinear distance D3 from the vehicle position to the destination is shorter than the preset distance in Step 114, the guide route control processor 31 re-calculates the guide route from the vehicle position to the destination (Step 119). Thereafter, the guide route control processor 31 causes the thus re-calculated guide route to be displayed and guides the vehicle along the guide route (Step 117).

Figure 13:
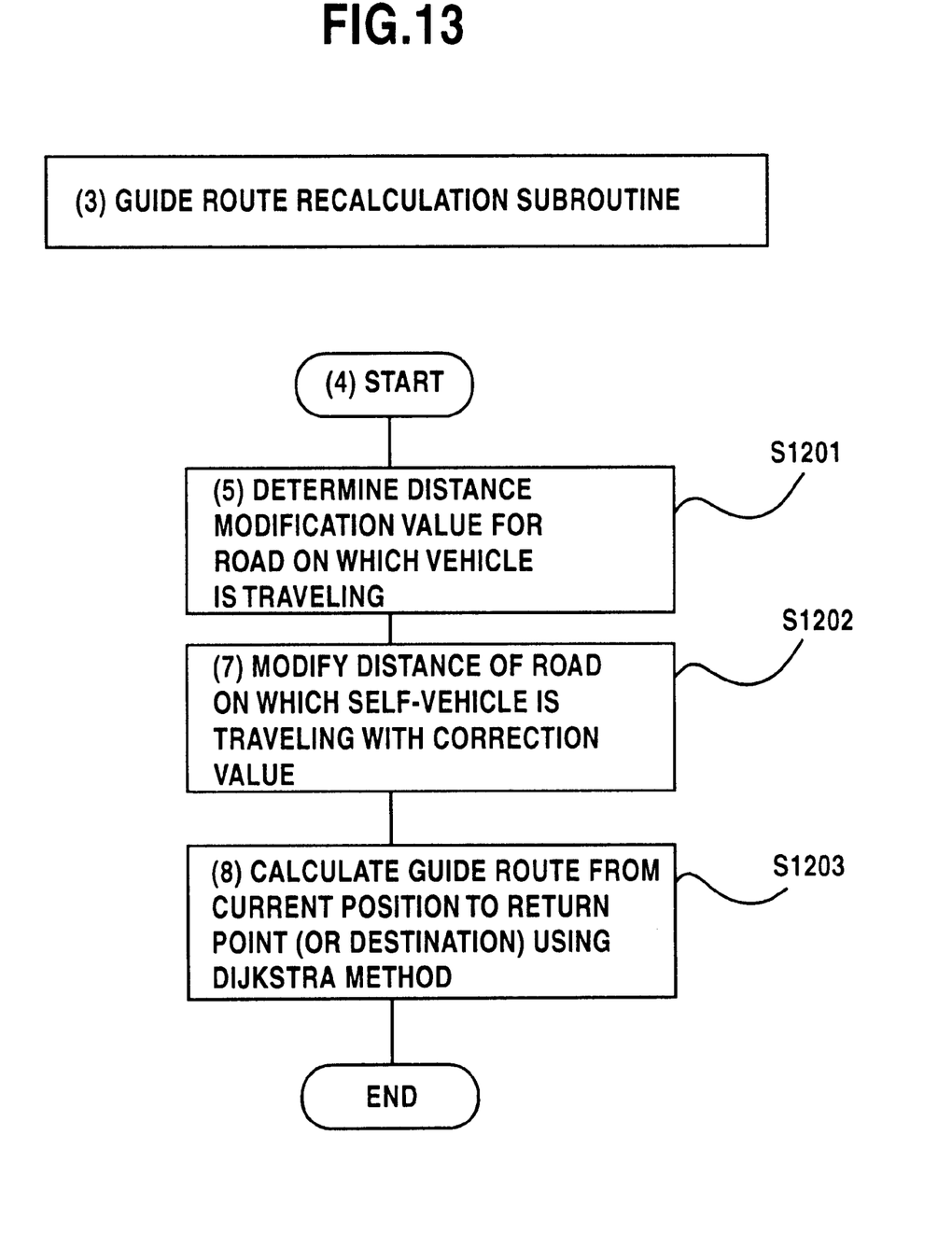
FIG. 13 is a flow chart illustrating a guide route recalculation subroutine of the present invention.
Figure 14:
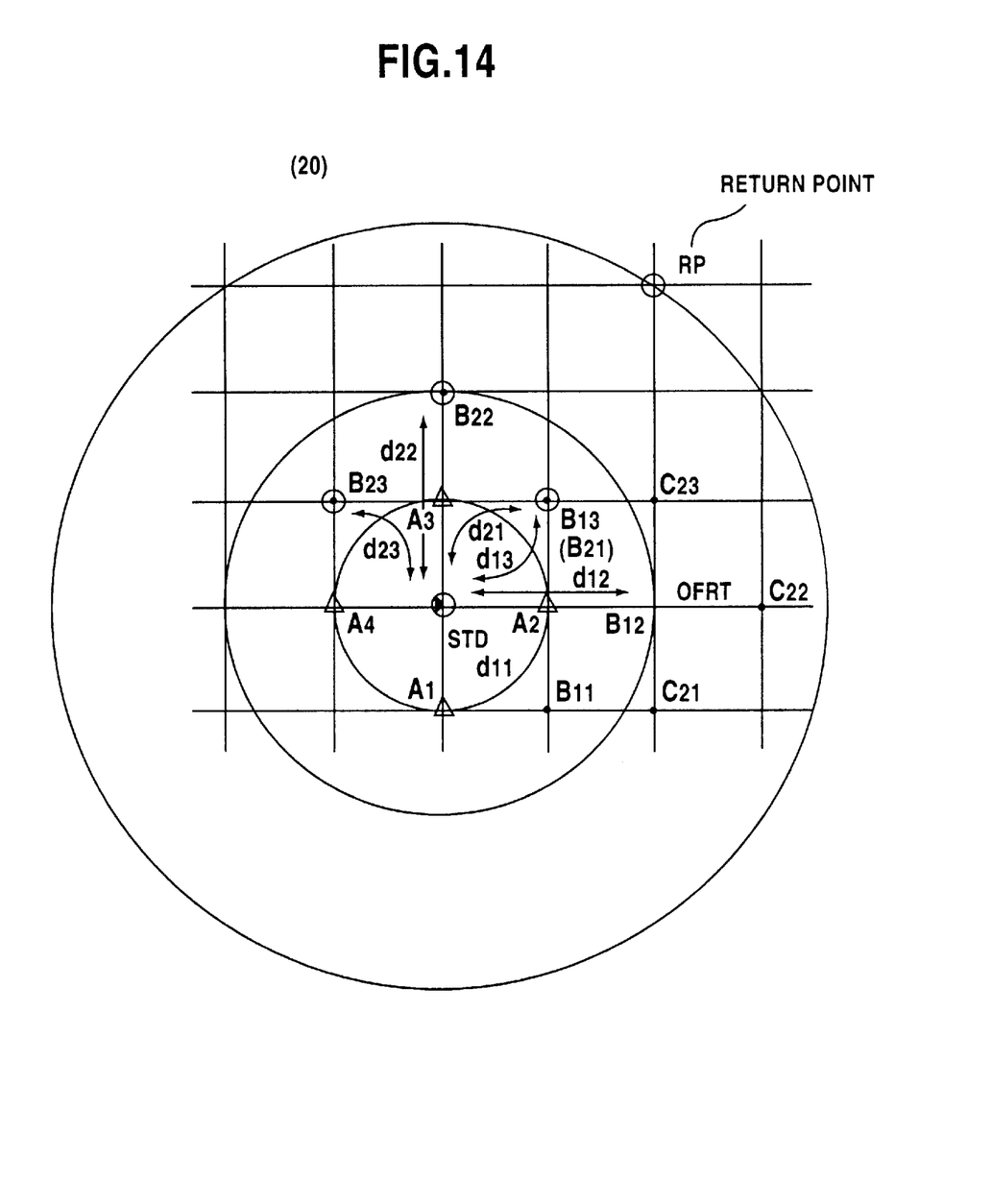
FIG. 14 is a diagrammatic view illustrating the Dijkstra method used for determining a return point route in the present invention.
Figure 15A:
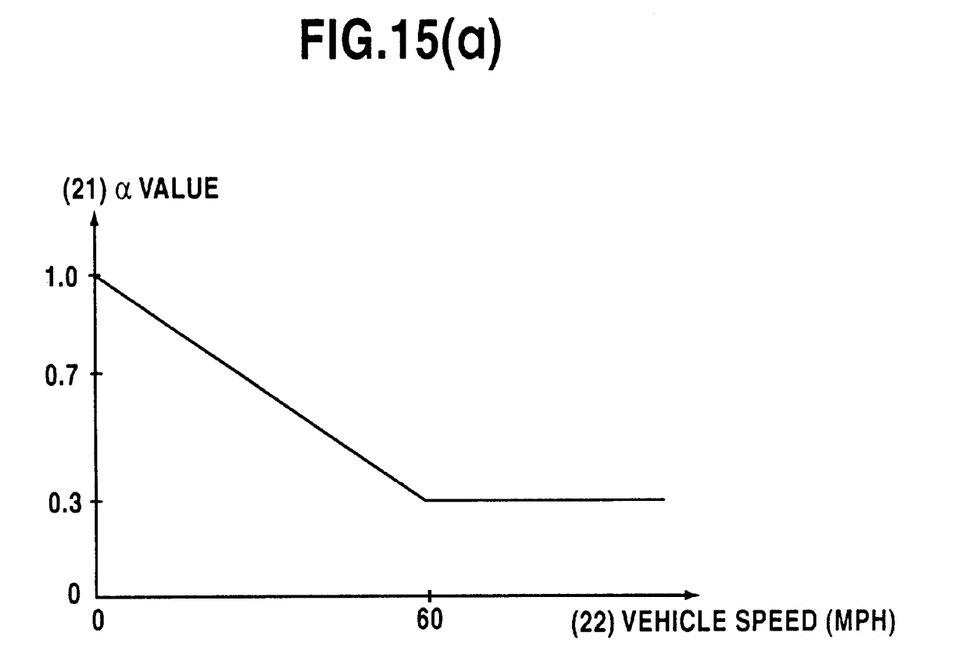
FIG. 15 is graph showing the relationship of the weighting factor to vehicle speed.
Figure 15B:
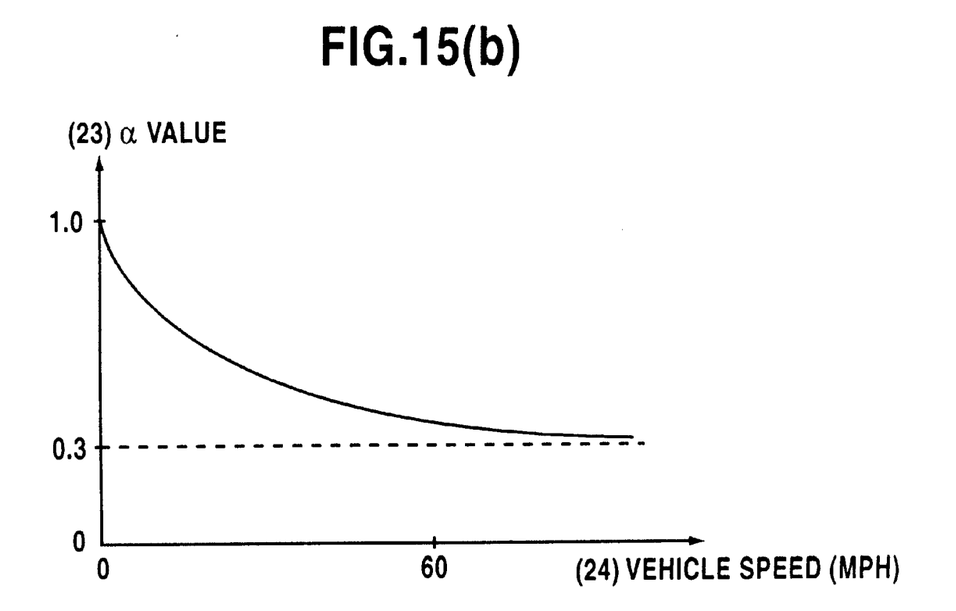

In Step 116 or Step 119 in the guide route recalculation processing, when the vehicle is in an off-route condition, the recalculation subroutine is executed, and processing illustrated in FIG. 13 is performed. Referring to FIG. 13, in the subroutine shown, the process of determining a modification value a for decreasing the weight of the distance on an off-route road OFRT along which the vehicle is traveling, is performed in Step S1201. The distance between forward intersections of the road along which the vehicle is traveling is modified by multiplication thereof by the modification or scale value (for example, α=0.6) in Step S1202 to make the forward intersection-to-intersection distance shorter than the actual intersection-to-intersection distance. In this instance, since modification is performed for no road other than the off-route road OFRT, the actual intersection distance is used for recalculation of the guide route. Then in Step S1203, the guide route from the current position to the return point (or destination) is recalculated using the Dijkstra method mentioned hereinabove. FIG. 14 schematically illustrates the guide route recalculation in which the Dijkstra method is used. Referring to FIG. 14, the current position STD of the vehicle is at the center of the circles, and the advancing direction of the vehicle is the rightward direction in this figure. In this instance, the off-route road is, as denoted at OFRT, the current position—A2—B12—C22. Further, the return point of the guide route recalculated is RP, and the guide route from the current position to the return point is recalculated. In this instance, since the off-route road OFRT is modified with the modification coefficient determined in Step S1201 of FIG. 13, the intersection-to-intersection distances d01 and d12 are determined to be shorter than the respective actual distances, and the tendency in which the guide route takes a straightforward route increases. However, if no intersection is present on the off-route road within a considerable distance after an intersection (for example, intersection A2) near the current position and the next intersection is an intersection C22 or another intersection following it, the guide route may take a route which turns at the intersection A2. It is to be noted that the modification value a in Step S1201 of FIG. 13 may be varied in response to the vehicle speed upon starting of the guide route recalculation from the value of the vehicle speed modification value a graph shown in FIG. 15. Where the modification value a is varied in this manner, when the vehicle is traveling at a high speed along the off-route road OFRT, the possibility becomes high that the guide route may be searched out so that it extends straightforwardly to a location of the off-route road at a far distance in the advancing direction of the vehicle, resulting in the reduction of the possibility that the vehicle may again enter an off-route condition. Further, while, in the embodiment described above, the guide route searching is performed based on the distance between intersections, the present invention is not limited to the specific embodiment, and where road data is given as costs, which is the effect of road conditions, between intersections (traveling times required on average), the modification to reduce a cost can be performed using the modification value a similar to the modification to a distance.

When the vehicle enters an off-route condition, since the intersection distance for guide route calculation of the off-route road OFRT is modified or scaled to a shorter distance, the possibility that the navigation apparatus may give a guidance for the vehicle to turn at an intersection on the off-route road near the current position decreases. Consequently, the possibility that the vehicle may enter another off-route condition in route searching for guiding the vehicle to a return point is decreased, and the result of the route searching can be utilized effectively.

The navigation system and method of navigation are controlled by a computer program which may be embodied on a computer-readable medium or otherwise embodied in the navigation system apparatus or which may be embodied on a computer-readable medium such as a CD ROM, separate from the system apparatus but which is installed in the system apparatus during operation of the system.

As described above, if the vehicle enters an off-route condition near the destination, then the navigation apparatus re-calculates a guide route to the destination and guides the vehicle along the re-calculated guide route. Consequently, a situation in which a route is set in a direction where the vehicle travels away from the destination or a route which makes the vehicle take a round about way to the destination is determined, as may occur with a conventional navigation apparatus, is eliminated.

Having now fully described the invention, it will be apparent to one of ordinary skill in the art that many changes and modifications can be made thereto without departing from the spirit and scope of the invention as set forth herein.

We claim:

1. A navigation apparatus for guiding a vehicle to a destination along a guide route, comprising:
   (a) an off-route detection means for detecting an off-route condition when the vehicle is on a road displaced from the guide route;
   (b) a guide route searching means for searching when the off-route detection means detects an off-route condition, a route from a present position of the vehicle to the destination or a return point on the guide route; said guide route searching means including:
      (i) weight factor determining means for determining a weighting value to modify a road parameter used in searching for the guide route;
      (ii) modifying means for modifying the road parameter of a road on which the vehicle is traveling based on the weighting value; and
      (iii) calculating means for calculating a route from the present position of the vehicle to the destination or the return point on the guide route, as a function of the modified parameter.

2. A navigation apparatus for guiding a vehicle to a destination comprising:
   a guide route searching means for searching for a route from the present position of the vehicle to a destination;
   weight factor determining means for determining a weighting value for modifying a road parameter used for searching a guide route;
   modifying means for modifying the road parameter, of the road on which the vehicle is traveling, based on the weighting value; and
   calculating means for calculating a guide route from the present position of the vehicle to the destination, in accordance with the modified parameter.

3. A navigation apparatus as set forth in claim 1 or 2, wherein the weighting factor varies as a function of vehicle speed.

4. A navigation apparatus as set forth in claim 3, wherein said weighting factor is varied with respect to the vehicle speed so that the guide route extends straightforwardly to a location at a far distance in the advancing direction of the vehicle when the vehicle speed is high.

5. A navigation apparatus as set forth in claim 1 or 2, wherein the parameter of the road is distance.

6. A navigation apparatus as set forth in claim 5, wherein said road has a plurality of intersections forward from said vehicle, said weight factor determining means determining a weighting value that modifies the distance between adjacent intersections to be shorter than their actual distances.

7. A navigation apparatus as set forth in claim 1 or 2, wherein said navigation apparatus includes a display for displaying said guide route.

8. A navigation apparatus as set forth in claim 1, further including end point determining means for determining the end point of said guide route when the vehicle is in off-route condition, as a function of the remaining distance from the present position to the destination.

9. A navigation apparatus as set forth in claim 1 wherein said weight factor determining means determines a weighting value for said modifying means so that said calculating means calculates said guide route to take a more straightforward route.

10. A navigation apparatus as set forth in claim 9, wherein said road parameter is distance, said road has a plurality of intersections forward from said vehicle, said weight factor determining means determining a weighting value that modifies the distance between adjacent intersections to be shorter than their actual distances.

11. A method of guiding a vehicle to a destination along a guide route, or to a return point on the guide route when the vehicle is in an off-route condition, said method comprising the steps of:
   (a) detecting an off-route condition of the vehicle when the vehicle is displaced from the guide route; and
   (b) determining upon detecting an off-route condition of the vehicle, a route from the present position of the vehicle to the return point on the guide route or the destination, wherein determining a route includes determining a weighting value, modifying a road parameter of a road on which the vehicle is traveling as a function of the weighting value, and calculating the route from the present position of the vehicle to the destination or the return point of the guide route, as a function of the modified parameter.

12. A method of guiding a vehicle as set forth in claim 11, wherein the weighting factor varies as a function of vehicle speed.

13. A method of guiding a vehicle as set forth in claim 7, wherein the road parameter is distance.

14. A method as set forth in claim 11, including the step of displaying the guide route.

15. A computer program embodied on a computer-readable medium for guiding a vehicle to a destination along a guide route, or to a return point on the guide route when the vehicle is in an off-route condition comprising determining upon detecting an off-route condition of the vehicle, a route from the present position of the vehicle to the return point on the guide route or the destination, wherein determining a route includes
   (i) determining a weighting value,
   (ii) modifying a road parameter of a road on which the vehicle is traveling as a function of the weighting value, and
   (iii) calculating the route from the present position of the vehicle to the destination or the return point of the guide route, as a function of the modified parameter.

16. A computer program as set forth in claim 15, wherein the weighting factor varies as a function of vehicle speed.

17. A computer program as set forth in claim 15, wherein the road parameter is distance.

18. A computer program as set forth in claim 15, including displaying the guide route.

19. A computer program as set forth in claim 15, wherein the computer-readable medium is a CD-ROM.

* * * * *